No. 866,094. PATENTED SEPT. 17, 1907.
E. VIAL, DEC'D.
L. B., B. & G. VIAL, HEIRESSES.
WATER CLARIFICATION.
APPLICATION FILED JUNE 22, 1904.
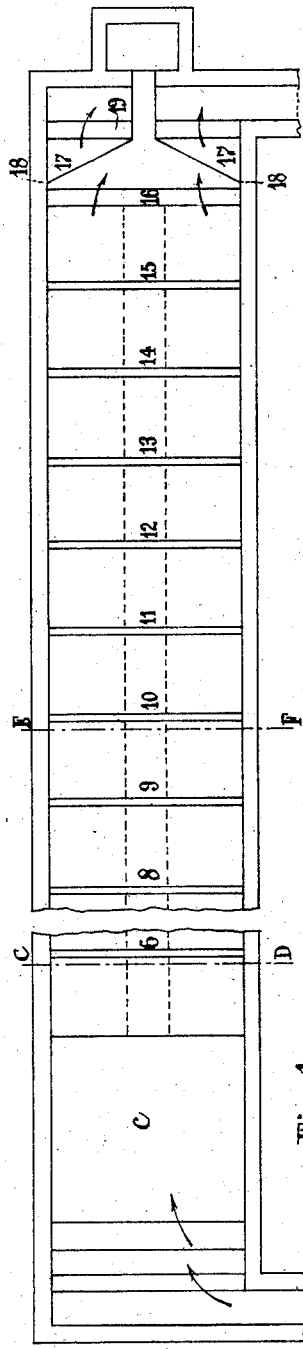
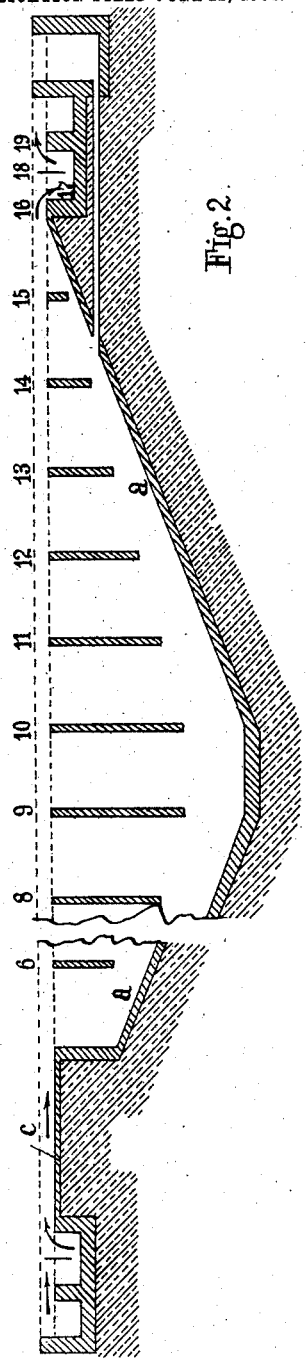
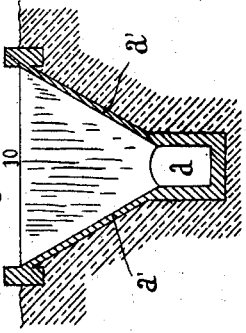
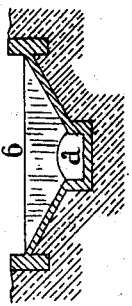
Witnesses
George G. Schoenlank
Thomas Kilpatrick
Inventor
Emile Vial
by H van Oldenneel
Attorney

UNITED STATES PATENT OFFICE.

EMILE VIAL, OF BRUSSELS, BELGIUM; LOUISE BOURGOIN VIAL, BLANCHE VIAL, AND GABRIELLE VIAL HEIRESSES AT LAW OF SAID EMILE VIAL, DECEASED.

WATER CLARIFICATION.

No. 866,094.  Specification of Letters Patent.  Patented Sept. 17, 1907.

Application filed June 22, 1904. Serial No. 213,721.

To all whom it may concern:

Be it known that I, EMILE VIAL, a citizen of the Republic of France, and residing at Brussels, Belgium, have invented a new and useful Improvement in Water Clarification; and I do hereby declare the following to be a full, clear, and exact description of the same.

Industrial clarification of muddy water, either in a coarse state or in combination with a clarifying reagent, is generally effectuated in an intermittent way, either by means of decantation or filtration. In order to obtain a continuous clarification, without filtration or period of interruption, the water to be clarified ought to be passed in thin and uniform strata over an immovable liquid mass, in other words, the superficial eddy must and the inner streams or currents resulting from the circulation must be completely avoided, as these cause a large part of the precipitated materials to rise towards the weir or overfall as it occurs in arrangements heretofore known. I attain this result by means of an improved form of clarifying tank with continuous circulation, characterized in two important particularities as hereinafter fully described and shown in the accompanying drawings.

Figure 1 is a plan view of the device; Fig. 2 is a longitudinal vertical section thereof; Fig. 3 is a section on line C—D, Fig. 1; and Fig. 4 is a section on line E—F, Fig. 1.

My improved clarifying tank is rectangular in form and has its bottom $a$ and sides $a^1$ preferably inclined (Fig. 4), said tank being sectioned in its entire length by means of partitions 6, 7, 8,...15 arranged transversely and close to each other, extending up to the same height to make flush with the horizontal water circulation plane, and down near to the bottom of the tank to leave sufficient space, that the lower layers of the liquid mass are in continuous communication. Said free communication of the lower liquid layers is necessary for attaining the desired result. Should the transverse partitions extend down to the bottom without leaving free spaces between them and the bottom, whereby the interior of the tank would be divided into several independent compartments, the superficial circulation in each one of the compartments would result in eddies and rising currents, which soon cause a large amount of the precipitated materials to rise from the bottom towards the weir, which would be objectionable.

Again, in my present arrangement the transverse partitions are submerged under the superficial plane of circulation for the purpose of insuring the perfectly horizontal and superficial movement of the water, and avoiding the formation of eddy and inner currents, in contradistinction with the usual arrangements, wherein partitions extend above the superficial plane for the purpose of causing the water to flow down to the bottom of the tank. The effect produced by my transverse partitions is to maintain the whole liquid mass in a perfect hydrostatic balance, as in communicating vessels, so that the muddy materials, introduced by circulation to the bottom of the tank, can only by displacement give rise to a quantity of clarified water equivalent to their volume, said displacement taking place only at the end of the tank towards the weir.

Exclusively superficial movement of the water is produced at the entrance of the tank, by the arrangement of a rigid plate $c$, preferably of brick or stonework, extending over the entire width of the tank and in line with the upper edges of the described partitions. The size of said plate depends on the more or less large amount of water to be clarified. The purpose of said plate is to produce a uniform circulating stratum, and to insure the perfect distribution thereof over the surface of the liquid mass, rendered immovable by the partitions herein described. Another purpose of said plate is to retain in a mechanical way, near the circulating plane, a horizontal muddy layer, into which the water, when arriving, leaves to drop its most tenuous solid particles.

The combination of the arrangements herein described permits of obtaining in a relatively small tank the perfect and continuous clarification of a large amount of circulating muddy water by mere gravity.

Having fully described my invention, what I claim and desire to secure by Letters Patent is:—

The improved apparatus for clarifying muddy water consisting of a tank substantially V shape in longitudinal section and having a flat plate or surface at its inlet end and at the top thereof over which the water flows in a thin horizontal stratum, a series of transverse partitions in the said tank the upper edges of which are in line with the horizontal plate and the lower edges of which are above the inclined bottom of the tank so as to provide a free communication between the several compartments at the bottom of the tank, the outlet from the said tank for the clarified water being above the plane of the lower edge of the shortest partition, substantially as described.

In testimony whereof I have signed this specification in the presence of two subscribing witnesses.

EMILE VIAL.

Witnesses:
CHARLES HOUDER,
GREGORY PHELAN.